United States Patent
Bender et al.

(10) Patent No.: US 10,180,189 B2
(45) Date of Patent: Jan. 15, 2019

(54) BEARING ISOLATOR SEAL WITH TAPERED STATIC SHUTOFF O-RING INTERFACE

(71) Applicant: Flowserve Management Company, Irving, TX (US)

(72) Inventors: Robert Paul Bender, Bettendorf, IA (US); Jason Matthew Malocha, Scotts, MI (US); Joseph Charles Barker, Delton, MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 15/533,129

(22) PCT Filed: Dec. 8, 2015

(86) PCT No.: PCT/US2015/064422
§ 371 (c)(1),
(2) Date: Jun. 5, 2017

(87) PCT Pub. No.: WO2016/094365
PCT Pub. Date: Jun. 16, 2016

(65) Prior Publication Data
US 2017/0363211 A1    Dec. 21, 2017

Related U.S. Application Data

(60) Provisional application No. 62/088,808, filed on Dec. 8, 2014.

(51) Int. Cl.
*F16J 15/32* (2016.01)
*F16J 15/447* (2006.01)
(Continued)

(52) U.S. Cl.
CPC ............. *F16J 15/447* (2013.01); *F16C 33/72* (2013.01); *F16J 15/164* (2013.01); *F16J 15/32* (2013.01); *F16J 15/4478* (2013.01)

(58) Field of Classification Search
CPC .... F16C 19/06; F16C 33/768; F16C 33/7886; F16C 33/80; F16J 15/164; F16J 15/3244; F16J 15/42; F16J 15/4478
See application file for complete search history.

(56) References Cited

U.S. PATENT DOCUMENTS 4,743,034 A    5/1988  Kakabaker et al.
4,989,883 A *  2/1991  Orlowski ............... F16J 15/008
                                                      277/303
(Continued)

FOREIGN PATENT DOCUMENTS

EP       0489604 A1    6/1992
JP       H07-004441 A  1/1995
NZ       552127 A      12/2010

OTHER PUBLICATIONS

PCT Search Report for PCT Application No. PCT/US2015/064422, dated Mar. 12, 2016, 10 pages.
(Continued)

*Primary Examiner* — Gilbert Y Lee
(74) *Attorney, Agent, or Firm* — Maine Cernota & Rardin

(57) ABSTRACT

A bearing isolator seal having a shut off O-ring is tolerant of axial rotor-stator misalignment and provides an enhanced static seal while minimizing rotational wear. A tapered section of the stator is overlapped by the shut off O-ring. When the rotor is static there is no axial misalignment, and the shut off O-ring is pressed against the tapered section, forming an enhanced seal. During rotor rotation, increased axial misalignment moves the O-ring away from the tapered section, reducing rotational wear. The stator can extend horizontally beyond the tapered section and below the O-ring, so that if the rotor moves beyond a maximum misalignment, there is a "line on line" fit between the stator and rotor. The bearing isolator seal can include labyrinth technology, and the tapered section can include a contour
(Continued)

that allows the shutoff O-ring to drag along the surface of the tapered section with no hang-ups or binding.

9 Claims, 8 Drawing Sheets

(51) Int. Cl.
*F16J 15/16* (2006.01)
*F16C 33/72* (2006.01)

(56) References Cited

U.S. PATENT DOCUMENTS

| | | | | |
|---|---|---|---|---|
| 5,069,461 | A * | 12/1991 | Orlowski | F16J 15/008 277/303 |
| 5,221,095 | A | 6/1993 | Orlowski | |
| 5,378,000 | A * | 1/1995 | Orlowski | F16J 15/164 277/311 |
| 5,957,462 | A | 9/1999 | Nishiyama et al. | |
| 6,062,568 | A | 5/2000 | Orlowski et al. | |
| 6,311,984 | B1 * | 11/2001 | Orlowski | F16J 15/004 277/412 |
| 6,583,376 | B2 * | 6/2003 | Kobayashi | B23H 7/02 219/69.12 |
| 7,052,014 | B1 | 5/2006 | Orlowski et al. | |
| 9,831,739 | B2 * | 11/2017 | Tejano | H02K 5/136 |
| 2001/0025831 | A1 | 10/2001 | Kobayashi | |
| 2002/0167131 | A1 * | 11/2002 | Orlowski | F16J 15/4478 277/371 |
| 2007/0029736 | A1 * | 2/2007 | Roddis | F16J 15/4478 277/345 |
| 2007/0138748 | A1 * | 6/2007 | Orlowski | F16J 15/4478 277/412 |
| 2008/0063330 | A1 * | 3/2008 | Orlowski | B65G 39/09 384/448 |
| 2011/0101618 | A1 | 5/2011 | Orlowski et al. | |
| 2011/0204734 | A1 | 8/2011 | Orlowski et al. | |
| 2014/0183998 | A1 * | 7/2014 | Hoehle | H01R 39/12 310/88 |
| 2014/0333031 | A1 | 11/2014 | Tones et al. | |
| 2015/0198252 | A1 * | 7/2015 | Jason | F16J 15/3404 277/408 |
| 2016/0208857 | A1 * | 7/2016 | Rea | F16C 33/80 |

OTHER PUBLICATIONS

PCT Search Report for PCT Application No. PCT/US2015/066578, dated 21 Mar. 2016, 13 pages.
International Preliminary Report on Patentability of PCT Application PCT/US2015/064422, dated 170613, 7 pages.
Extended European Search Report of European Application No. EP15871142.4 dated Jul. 9, 2018, 5 pages.
Extended European Search Report of European Application No. EP5866597.6 dated May 24, 2018, 7 pages.

* cited by examiner

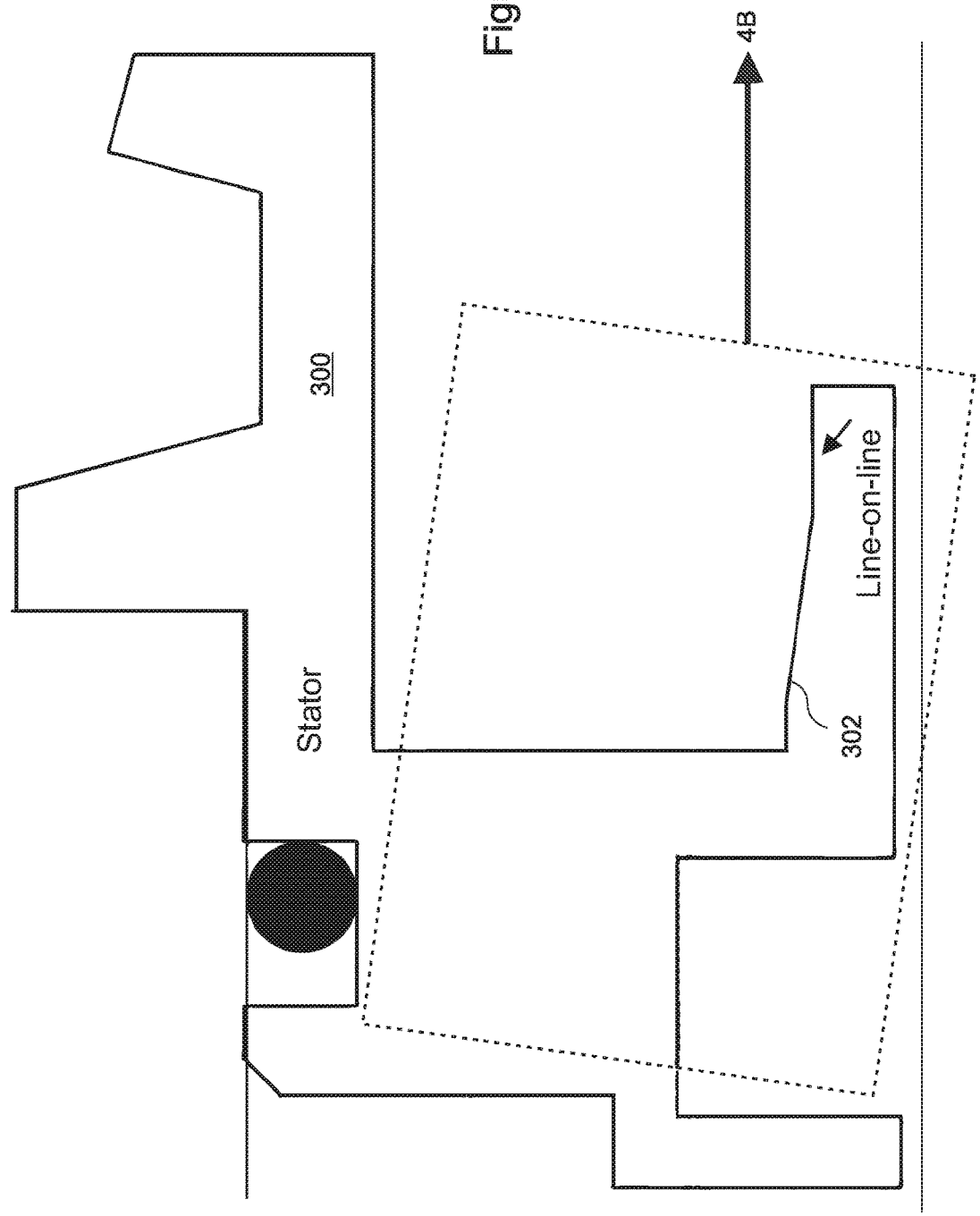

BEARING ISOLATOR SEAL WITH TAPERED STATIC SHUTOFF O-RING INTERFACE

RELATED APPLICATIONS

This application is a national phase application filed under 35 USC § 371 of PCT Application No. PCT/US2015/064422 with an International filing date of Dec. 8, 2015 which claims the benefit of U.S. Provisional Application No. 62/088,808, filed Dec. 8, 2014. Each of these applications is herein incorporated by reference in its entirety for all purposes.

FIELD OF THE INVENTION

The invention relates to bearing isolator seals, and more particularly, to bearing isolator seals that include a static shutoff O-ring.

BACKGROUND OF THE INVENTION

Bearing isolator seals are commonly used in a variety of rotating shaft applications when it is necessary to exclude contaminants or process fluid from reaching internal mechanisms such as shaft support bearings, or from leaking out of a housing that is penetrated by the rotating shaft.

For example, bearing isolator seals are used in bearing housings for pumps, motors, gearboxes and other pieces of rotating equipment. The main purpose of a bearing isolator seal is to prevent the ingress of process fluid or other contaminants into the bearing, which can lead to premature failure of the lubrication and bearings. In fact, penetration by contaminants is the most common reason for rotating equipment failure.

For many applications, lip seals and simple labyrinths have proven inadequate for preventing ingress of contamination into bearings. In many cases, the use of bearing isolator seals can extend rotating equipment lifespans by a factor of 2 to 5, as compared to the typical equipment lifespans when standard lip seals or simple labyrinths are used.

Some bearing isolator designs include a static "shut off" feature that seals the air gap between the rotor and the stator of the bearing isolator seal when the equipment is not running. Examples of such designs are presented in FIGS. 1A through 2, where the design of FIGS. 1A-1C includes a shut off O-ring, and the design of FIG. 2 utilizes inclines in different orientations to perform the static sealing function. FIGS. 1B and 1C are enlarged cross sectional views of the "VBX Ring" of FIG. 1A that includes the shut off O-ring. Typically, the shut off feature includes an O-ring 100 that rotates with the rotor 102 and surrounds an extension of the stator 104. When the rotor 102 is rotating, as is illustrated in FIG. 1B, the O-ring 100 is expanded away from the stator 104 by centrifugal force and, hopefully, does not interfere with rotation of the rotor 102 relative to the stator 104. But when the rotor 102 is static, as is shown in FIG. 1C, the O-ring 100 is allowed to contract and seal against the stator extension 104, so as to seal the gap between the rotor 102 and the stator 104.

Unfortunately, in this approach it can be difficult to provide a desired degree of static shut off without also avoiding any residual contact or "interference" between the O-ring and the stator when the rotor is rotating. The result can be a compromise between wear and resistance due to residual O-ring interference when the mechanism is in operation, versus the degree of seal protection provided when the mechanism is idle.

Also, axial misalignment is a major concern for shut off mechanisms of this type, and must be accounted for in the design of a static shut off feature. Typically, there can be a tendency for the rotor to move axially away from the stator during operation, causing axial "misalignment" between the rotor and the stator, and to return to a closer static or "neutral" position when the system is idle. However, most shut off designs, such as the one shown in FIGS. 1B and 1C, are intolerant of axial misalignment between the rotor and the stator, and many require that the axial misalignment be limited to only 0.007 inch (0.18 mm) Total Indicator Reading ("TIR") or less. As a result, many applications that require a greater degree of tolerance to axial misalignment are not suitable for use with a simple shut off mechanism such as the one shown in FIGS. 1B and 1C, and require use of other, more complicated and expensive designs.

What is needed, therefore, is a cost-effective bearing isolator seal having a static shut off feature that is tolerant of axial misalignment between the rotor and stator, and which provides an improved static seal between the rotor and the stator while minimizing wear and resistance when the rotor is rotating and axially misaligned relative to the stator.

SUMMARY OF THE INVENTION

A cost effective bearing isolator seal that includes a static shut off feature based on a shut off O-ring is tolerant of axial misalignment between the rotor and stator, provides an improved static seal between the rotor and the stator, and minimizes wear and resistance when the rotor is rotating relative to the stator.

The stator of the bearing isolator seal includes a tapered section located in an inboard region of the interface between the rotor and stator, adjacent to the shut off O-ring. When the rotor is static, and there is no axial misalignment between the rotor and the stator, the shut off O-ring's nominal inside diameter is pressed against the tapered section of the stator, forming an enhanced static seal. The angle of the taper is toward the rotor, which biases the shut off O-ring against the shut off O-ring's containment groove on the rotor, enabling the static seal when no misalignment is present.

When the rotor is rotating and is axially separated from the stator due to axial misalignment, the interference of the shut off O-ring's nominal inside diameter with the tapered section is reduced. And in embodiments, when the target maximum misalignment is reached, the interference between the shut off O-ring's inner diameter and the stator becomes a "line on line" fit, thereby maintaining static shut off capability throughout the axial misalignment range.

In embodiments, the bearing isolator seal also includes labyrinth technology that further enhances the exclusion of contaminants. In some of these embodiments, a close radial clearance is maintained between the rotor and stator at the location of the tapered section and below the centerline of the O-ring cross section, thereby maximizing the effectiveness of the rotor groove in creating contact with the O-ring and ensuring lift off with rotation. Although the axial overlap of the rotor with the stator is reduced as the rotor shifts axially away from the stator during operation, the radial clearance remains unchanged.

In various embodiments, the tapered section of the stator includes a contour that allows the shutoff O-ring to drag along the surface of the tapered section with no hang-up or binding.

It will therefore be apparent to one of ordinary skill in the art that the present invention does not avoid or simply tolerate axial misalignment, but instead takes advantage of axial misalignment. Due to the tapered section of the stator in the present invention, the interference between the O-ring and the stator is increased when the rotor is idle and in its neutral position, and decreased when the rotor is in operation and axially misaligned with the stator. Accordingly, when the rotor is rotating, the interference between the shut off O-ring and the stator is reduced by both a radial shifting and an axial shifting of the O-ring, due to outward expansion of the O-ring inner diameter by centripetal acceleration, and due to the axial shifting of the O-ring away from the tapered section of the stator. The result is an enhanced static seal when the bearing isolator seal is idle and reduced wear and resistance when the bearing isolator seal is in operation.

The present invention is a bearing isolator seal that includes a rotor surrounding and rotationally fixed to a rotatable shaft, said rotatable shaft being configured to rotate about a rotation axis, an O-ring retention groove formed in an inward-facing surface of the rotor, a shut off O-ring expandably located within the O-ring retention groove and configured to rotate with the rotor, the shut off O-ring having an inner diameter that extends inwardly beyond the inward facing surface of the rotor, a stator surrounding the rotatable shaft and configured to remain stationary when the rotor is rotating, the rotor and stator being configured to allow the rotor to shift axially relative to the stator from a neutral, axially aligned position when at rest to an axially misaligned position further removed from the stator while rotating, a stator extension, the stator extension being an extension of the stator that is overlapped by the shut off O-ring, so that the shut off O-ring makes a seal with the stator extension when the rotor is at rest, but is expanded away from the stator extension by centripetal force when the rotor is rotating, and a tapered section included in the stator extension, the tapered section being a section of the stator extension that is at least partly overlapped by the shut off O-ring when the rotor is in the neutral position, the tapered section having a surface that is tapered such that a diameter of the stator extension directly beneath the O-ring is reduced when the rotor is in the axially misaligned position, as compared to when the O-ring is in the neutral position.

Embodiments further include a labyrinth passage between the rotor and the stator, the labyrinth passage being configured to expel fluid in the passage away from the shut off O-ring by centrifugal force when the rotor is rotating.

In some embodiments, interference between the tapered section and the shut off O-ring declines linearly as the rotor moves away from the stator, until a maximum axial displacement is reached. Some of these embodiments further include a horizontal section of the stator that extends under the shut off O-ring beyond the tapered section, the horizontal section being configured to form a line-on-line fit with the shut off O-ring when the rotor moves beyond the maximum axial displacement. In other of these embodiments the maximum axial displacement is at least 0.020 inches (0.51 mm).

In various embodiments, the tapered section is circumferentially consistent around the rotatable shaft. And in certain embodiments the tapered section of the stator includes a contour that allows the shutoff O-ring to drag along a surface of the tapered section without hanging up or binding.

In some embodiments the tapered section is tapered at an angle of between two degrees and thirty degrees from the rotation axis.

And in other embodiments, edges of the O-ring retention groove are located below a horizontal centerline of the O-ring and in close clearance to the surface of the tapered section when the rotor is at rest.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4A is a cross sectional view of the stator of FIG. 3A; and

DETAILED DESCRIPTION

The present invention is a cost effective bearing isolator seal, including a static shut off feature based on a shut off O-ring, that is tolerant of axial misalignment between the rotor and stator, provides an improved static seal between the rotor and the stator, and minimizes wear and resistance when the rotor is rotating relative to the stator.

Figure 3A:
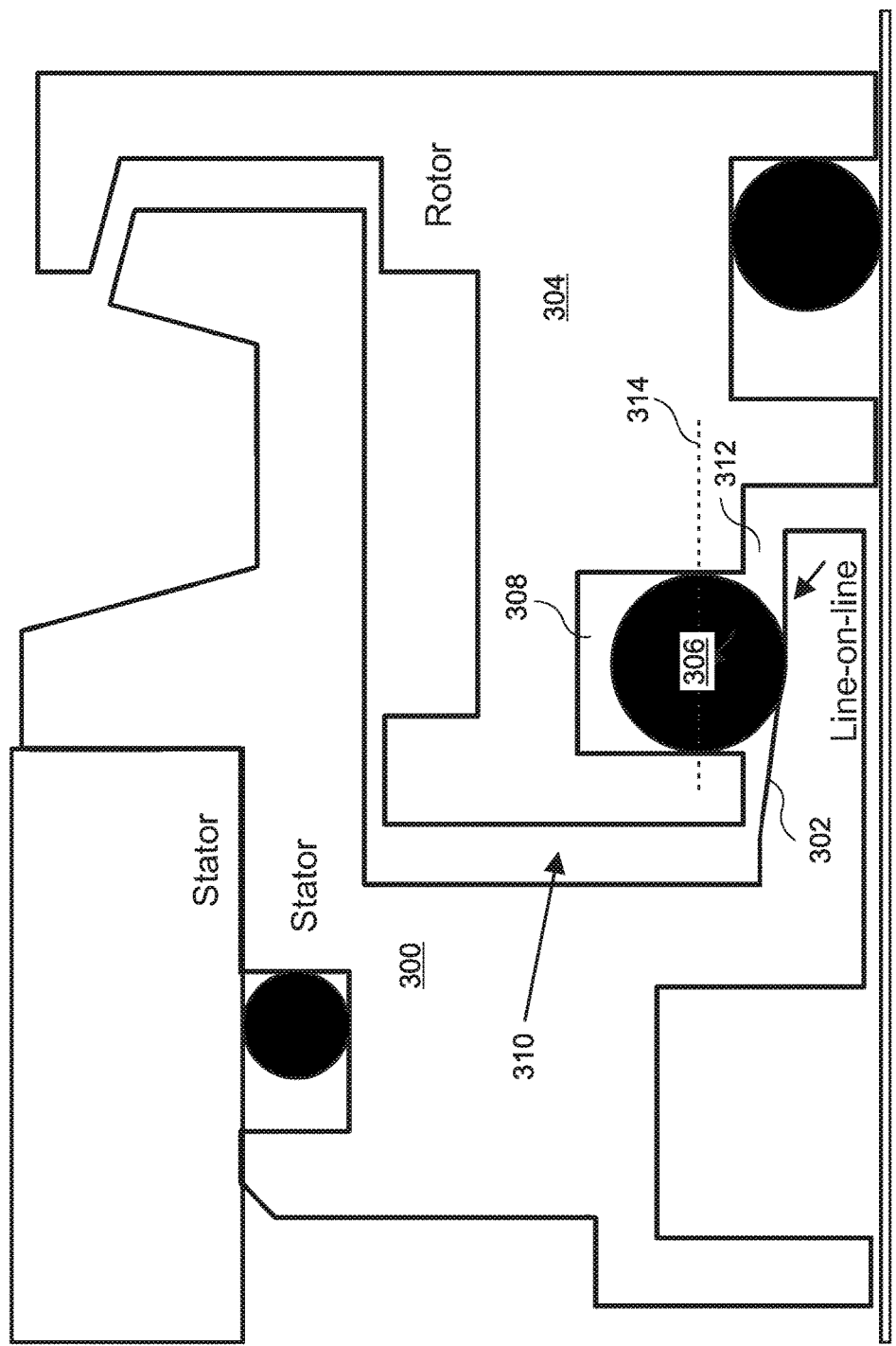
FIG. 3A is a cross-sectional view of an embodiment of the present invention, shown with an axial misalignment that is less than a maximum misalignment.

With reference to FIG. 3A, the stator 300 of the bearing isolator seal includes a tapered section 302 located in an inboard region of the interface between the rotor 304 and stator 300, adjacent to the shut off O-ring 306. Because FIG. 3A is a cross-sectional illustration, the tapered section 3A appears as in inclined section. When the rotor 304 is static, and there is no axial misalignment between the rotor 304 and the stator 300, the shut off O-ring's nominal inside diameter is pressed against the tapered section 302 of the stator, forming an enhanced static seal. The angle of the tapered section 302 is toward the rotor 304, which biases the shut off O-ring 306 against the shut off O-ring's containment groove 308 on the rotor 304, enabling the static seal when no misalignment is present.

Figure 3B:
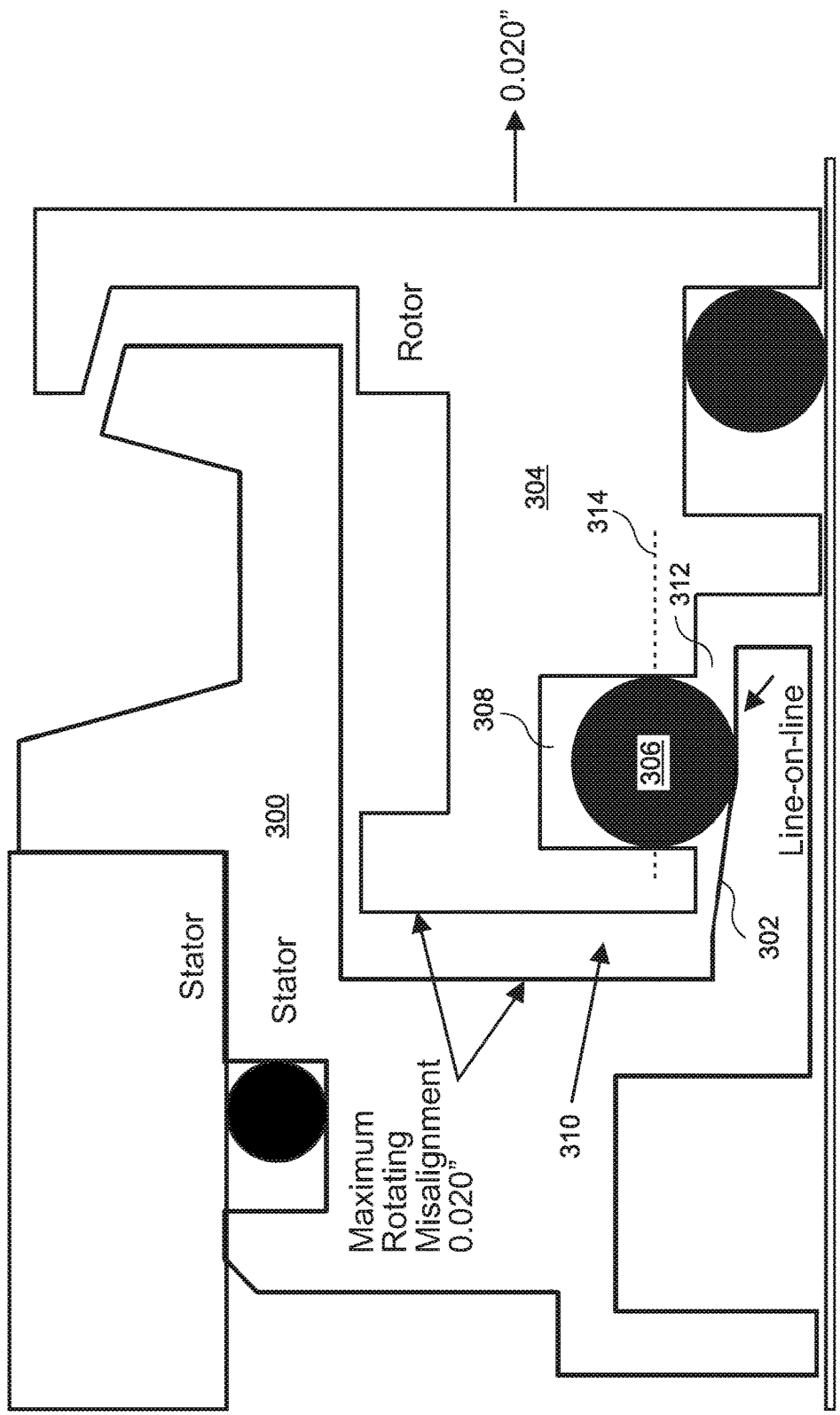
FIG. 3B is a cross-sectional view of the embodiment of FIG. 3A, shown without any axial misalignment.

When the rotor 304 is rotating and is axially separated from the stator 300 due to axial misalignment, the interference of the shut off O-ring's nominal inside diameter with the tapered section 302 is reduced. And when the target maximum misalignment is reached, as is illustrated in FIG. 3B, the interference between the shut off O-ring's inner diameter and the stator 300 becomes a "line on line" fit, thereby maintaining static shut off capability throughout the axial misalignment range. On the other hand, when the rotor is static and in its static axial location, as illustrated in FIG. 3C, the interference of the shut off O-ring's nominal inside diameter with the tapered section 302 is increased, as the shut off O-ring 306 is shifted closer to the tapered section 302 of the stator 300.

Figure 1A:
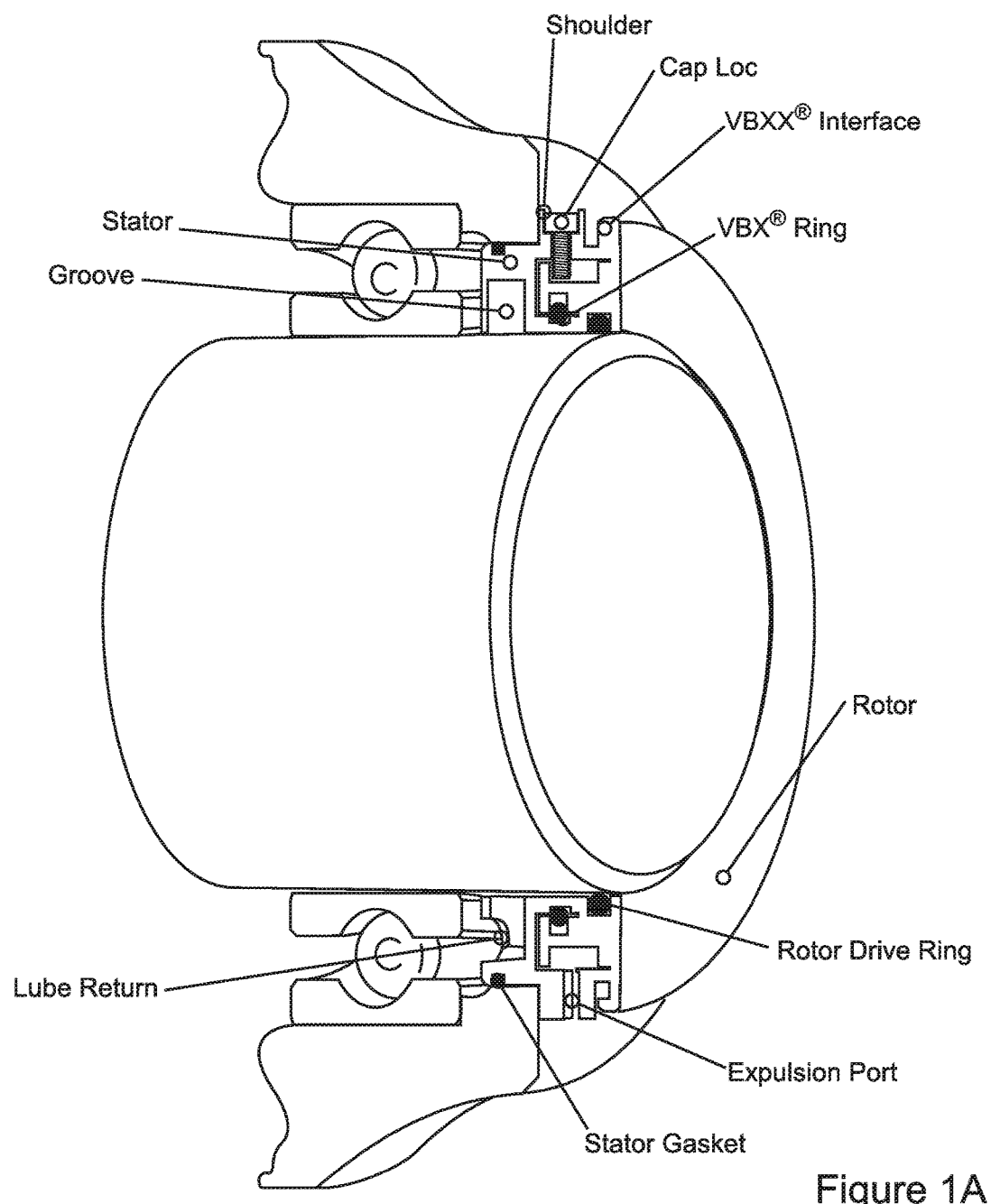
FIG. 1A is a perspective view of a bearing isolator seal of the prior art that includes a shut off O-ring.
Figure 1C:
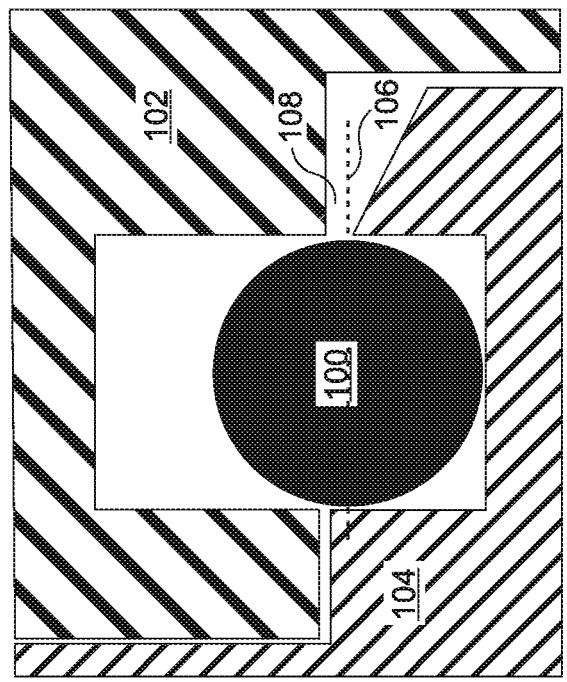
FIG. 1C is a magnified view of the shut off O-ring of FIG. 1A as it is configured when the rotor is at rest.
Figure 1B:
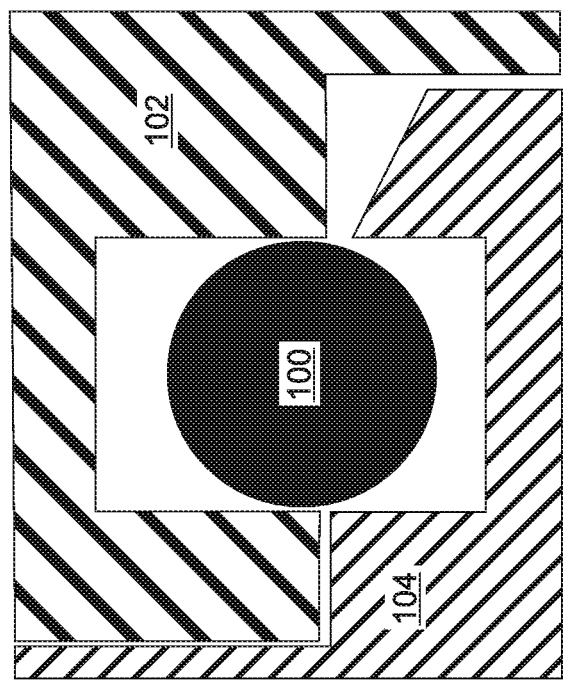
FIG. 1B is a magnified view of the shut off O-ring of FIG. 1A as it is configured during rotation of the rotor.
Figure 2:
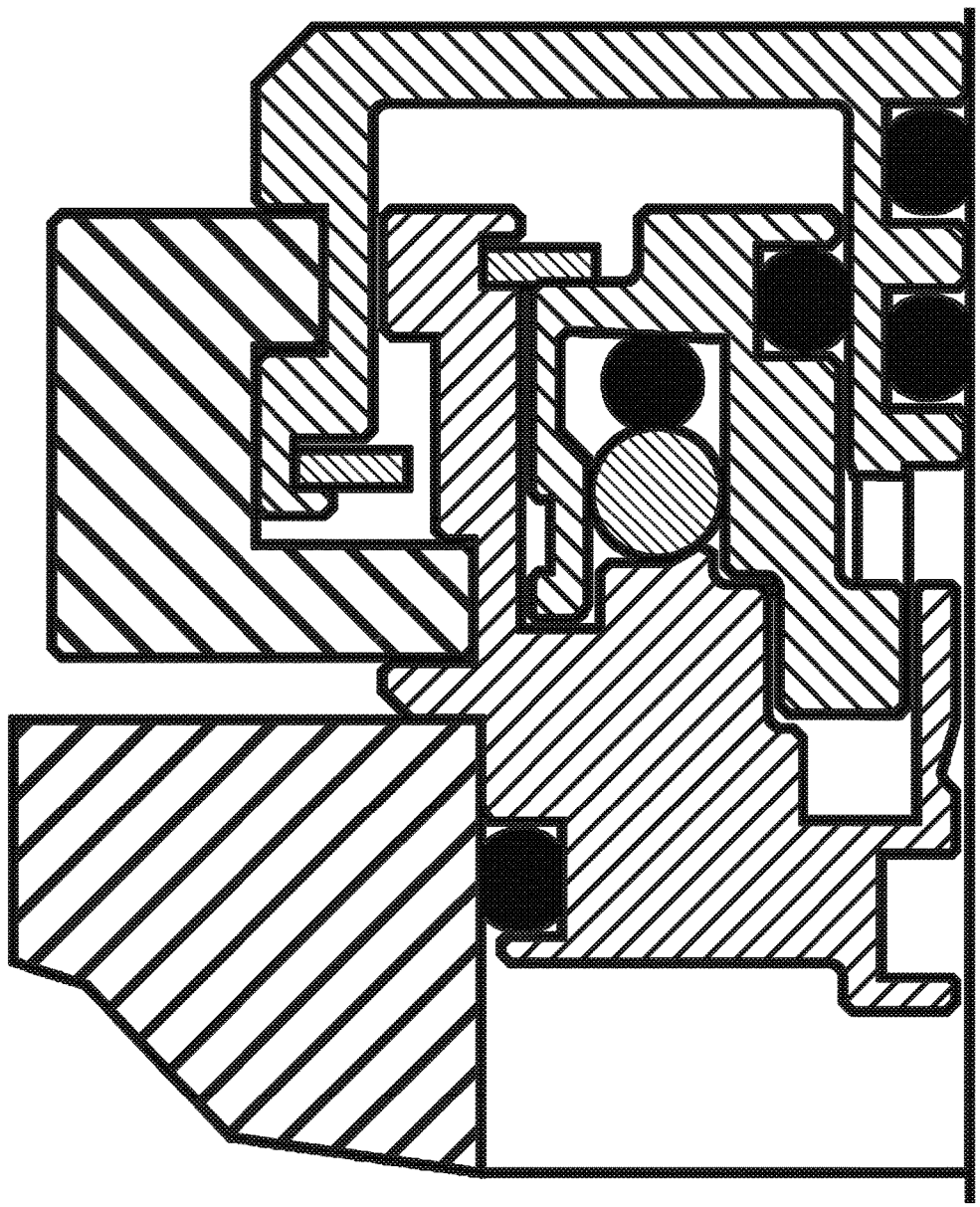
FIG. 2 is a perspective view of a bearing isolator seal of the prior art that utilizes inclines in different orientations to perform the static sealing function.

In embodiments, the bearing isolator seal also includes labyrinth technology 310 that further enhances the exclusion of contaminants. In the embodiment of FIGS. 3A-3C, a close radial clearance 312 is maintained between the rotor 304 and stator 300 at the location of the tapered section 302 to maximize the effectiveness of the labyrinth technology 310. As illustrated in the figure, this close clearance 312 is placed below the centerline 314 of the O-ring cross section, thereby maximizing the effectiveness of the rotor groove 308 in creating contact with the O-ring 306 and ensuring lift off of the O-ring 306 from the stator 300 when the rotor is rotating. This can be contrasted with FIG. 1C, where the centerline 106 of the O-ring 100 falls within or below the radial clearance 108, even when the rotor is at rest.

In FIG. 3A, it can be seen that although the axial overlap of the rotor 304 with the stator 300 is reduced as the rotor 304 shifts axially away from the stator 300 during operation, the radial clearance 312 remains unchanged.

Figure 3C:
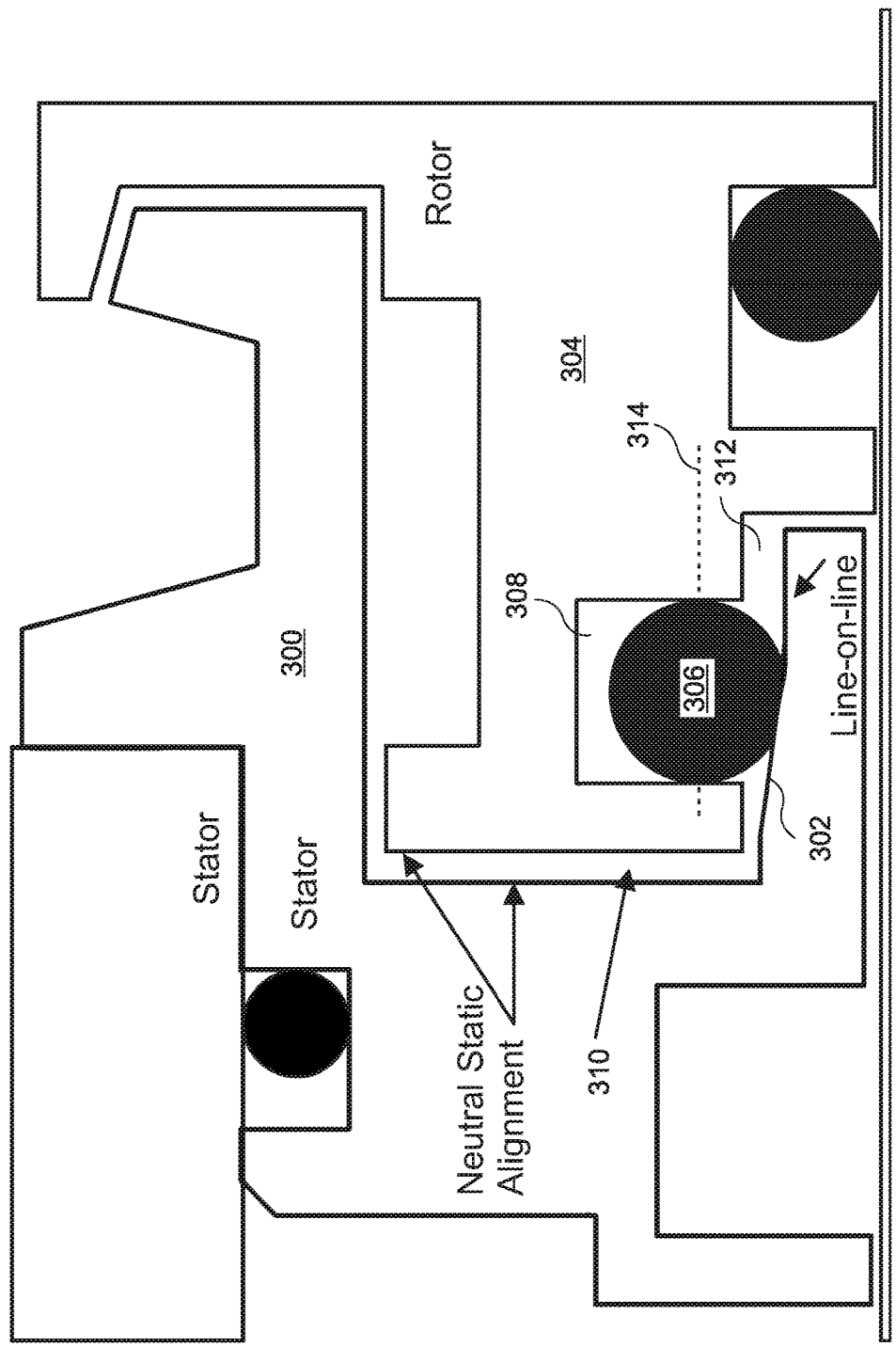
FIG. 3C is a cross-sectional view of the embodiment of FIG. 3A, shown with an axial misalignment equal to the maximum misalignment.
Figure 4B:
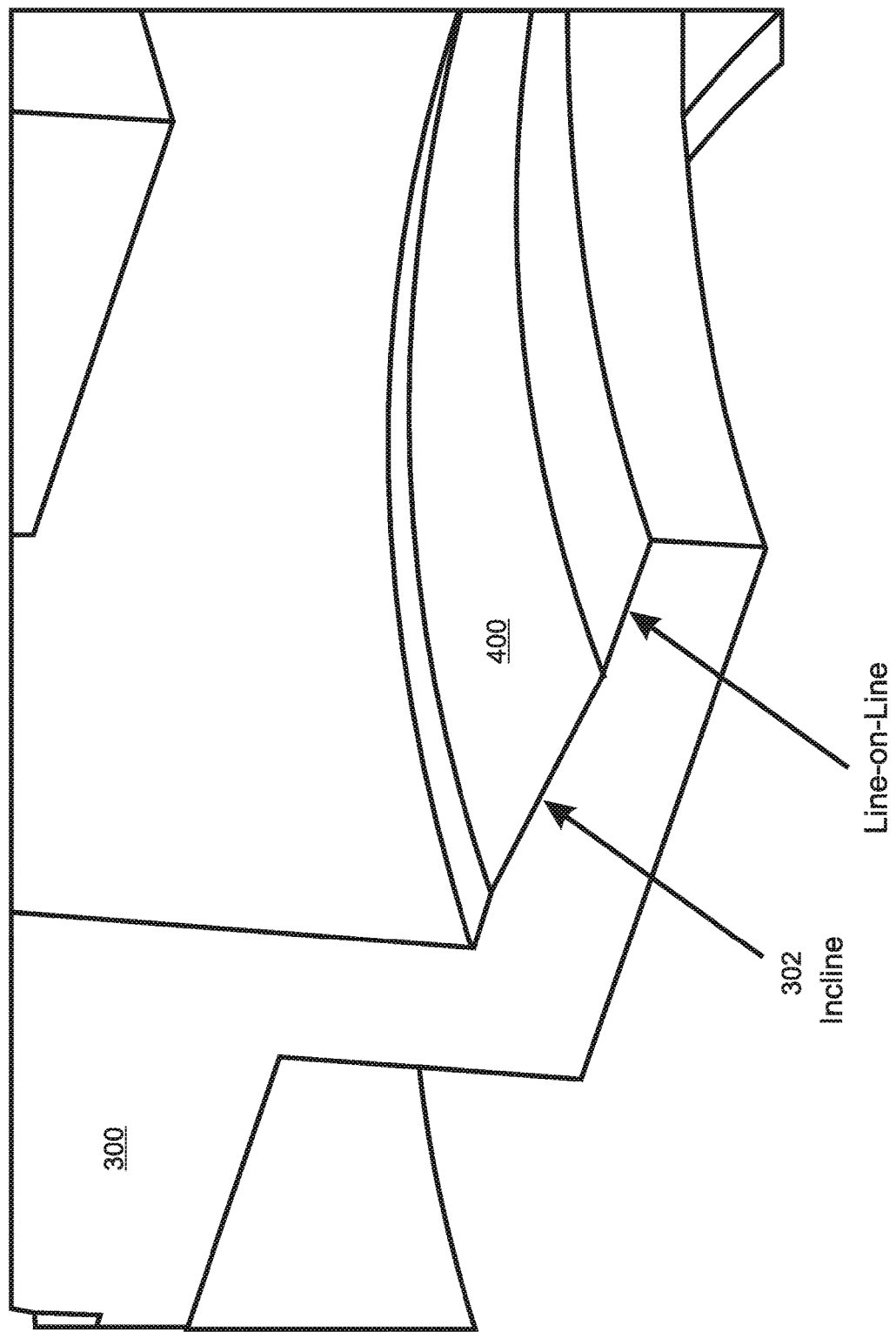
FIG. 4B is a perspective view of a portion of the stator of FIG. 4A, showing a contour of the tapered section of the stator.

FIG. 4A is a cross sectional illustration of the stator of FIGS. 3A through 3C. The dotted rectangle in the figure indicates the section that is illustrated in the perspective sectional view of FIG. 4B. In various embodiments, the tapered section 302 of the stator 300 includes a contour 400 that allows the shutoff O-ring 306 to drag along the surface of the tapered section 302 with no hang-up or binding.

It will be apparent to one of ordinary skill in the art that the present invention does not avoid or simply tolerate axial misalignment, but instead takes advantage of axial misalignment. Due to the tapered section 302 of the stator in the present invention, the interference between the O-ring 306 and the stator 300 is increased when the rotor 304 is idle and in its neutral position, and decreased when the rotor 304 is in operation and axially misaligned with the stator 300. Accordingly, when the rotor 304 is rotating, the interference between the shut off O-ring 306 and the stator 300 is reduced by both a radial and an axial shifting of the O-ring 306, due to outward expansion of the O-ring inner diameter by centripetal acceleration, and due to the axial shifting of the O-ring 306 away from the tapered section 302 of the stator. The result is an enhanced static seal when the bearing isolator seal is idle and reduced wear and resistance when the bearing isolator seal is in operation.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A bearing isolator seal comprising:
   a rotor surrounding and rotationally fixed to a rotatable shaft, said rotor having an inward-facing surface spaced radially outward from said rotatable shaft, a rotor gap being formed therebetween, said rotatable shaft being configured to rotate about a rotation axis;
   an O-ring retention groove formed in the inward-facing surface of the rotor;
   a shut off O-ring expandably located within the O-ring retention groove and configured to rotate with the rotor, the shut off O-ring forming a seal with sides of the O-ring retention groove, and having an inner diameter that extends inwardly beyond the inward facing surface of the rotor when the rotor is at rest;
   a stator surrounding the rotatable shaft and configured to remain stationary when the rotor is rotating, the rotor and stator being configured to allow the rotor to shift axially relative to the stator from a neutral, axially aligned position when at rest to an axially misaligned position further removed from the stator while rotating;
   a stator extension, the stator extension being an extension of the stator that extends axially into the rotor gap between the rotor inward-facing surface and the rotatable shaft and is overlapped by the shut off O-ring, so that the inner diameter of the shut off O-ring is elastically pressed against the stator extension and makes a seal with the stator extension when the rotor is at rest, but is expanded away from the stator extension by centripetal force when the rotor is rotating; and
   a tapered section included in the stator extension, the tapered section being a section of the stator extension that is at least partly overlapped by the shut off O-ring when the rotor is in the neutral position, the tapered section having a surface that is tapered such that a diameter of the stator extension directly beneath the O-ring is reduced when the rotor is in the axially misaligned position, as compared to when the O-ring is in the neutral position.

2. The bearing isolator seal of claim 1, further comprising a labyrinth passage between the rotor and the stator, the labyrinth passage being configured to expel fluid in the passage away from the shut off O-ring by centrifugal force when the rotor is rotating.

3. The bearing isolator seal of claim 1, wherein interference between the tapered section and the shut off O-ring declines linearly as the rotor moves away from the stator, until a maximum axial displacement is reached.

4. The bearing isolator seal of claim 3, further comprising a horizontal section of the stator that extends under the shut off O-ring beyond the tapered section, the horizontal section being configured to form a line-on-line fit with the shut off O-ring when the rotor moves beyond the maximum axial displacement.

5. The bearing isolator seal of claim 3, wherein the maximum axial displacement is at least 0.020 inches (0.51 mm).

6. The bearing isolator seal of claim 1, wherein the tapered section is circumferentially consistent around the rotatable shaft.

7. The bearing isolator seal of claim 1, wherein the tapered section of the stator includes a contour that allows the shutoff O-ring to drag along a surface of the tapered section without hanging up or binding.

8. The bearing isolator seal of claim 1, wherein the tapered section is tapered at an angle of between two degrees and thirty degrees from the rotation axis.

9. The bearing isolator seal of claim 1, wherein edges of the O-ring retention groove are located below a horizontal centerline of the O-ring and in close clearance to the surface of the tapered section when the rotor is at rest.

* * * * *